(12) United States Patent
Juhasz (10) Patent No.: US 9,681,358 B2
(45) Date of Patent: Jun. 13, 2017

(54) DEAD ZONE FOR WIRELESS COMMUNICATION DEVICE

(75) Inventor: Paul R. Juhasz, Houston, TX (US)

(73) Assignee: Paul R. Juhasz, Houston, TX (US)

( * ) Notice: Subject to any disclaimer, the term of this patent is extended or adjusted under 35 U.S.C. 154(b) by 0 days.

(21) Appl. No.: 13/462,712

(22) Filed: May 2, 2012

(65) Prior Publication Data

US 2012/0225673 A1    Sep. 6, 2012

Related U.S. Application Data (63) Continuation of application No. 12/571,090, filed on Sep. 30, 2009, now abandoned.

(60) Provisional application No. 61/195,016, filed on Oct. 2, 2008.

(51) Int. Cl.
| | |
|---|---|
| *H04W 24/00* | (2009.01) |
| *H04M 3/00* | (2006.01) |
| *H04W 48/02* | (2009.01) |
| *H04W 4/02* | (2009.01) |

(52) U.S. Cl.
CPC .............. *H04W 48/02* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 6,011,973 | A * | 1/2000 | Valentine | H04W 48/04 342/357.59 |
| 6,230,017 | B1 * | 5/2001 | Andersson et al. | 455/456.6 |
| 6,496,703 | B1 * | 12/2002 | da Silva | 455/456.4 |
| 6,690,940 | B1 * | 2/2004 | Brown et al. | 455/456.4 |
| 6,832,093 | B1 * | 12/2004 | Ranta | 455/456.4 |
| 6,973,333 | B1 | 12/2005 | O'Neill | |
| 6,999,767 | B1 * | 2/2006 | Jeong | 455/439 |
| 7,194,273 | B2 * | 3/2007 | Vaudreuil | 455/456.3 |
| 7,194,278 | B1 | 3/2007 | Cook | |
| 7,245,908 | B1 * | 7/2007 | Weaver et al. | 455/430 |
| 7,783,307 | B2 | 8/2010 | Hovestadt | |
| 8,611,928 | B1 * | 12/2013 | Bill | H04W 48/04 455/414.2 |
| 2003/0104843 | A1 * | 6/2003 | Geren et al. | 455/569 |
| 2003/0203731 | A1 | 10/2003 | King et al. | |
| 2003/0211874 | A1 | 11/2003 | Mizuta et al. | |
| 2004/0072578 | A1 * | 4/2004 | Keutmann et al. | 455/456.1 |
| 2004/0128310 | A1 | 7/2004 | Zmudzinski et al. | |
| 2004/0166878 | A1 * | 8/2004 | Erskine | H04W 48/04 455/456.1 |
| 2004/0253963 | A1 | 12/2004 | Park et al. | |
| 2005/0060669 | A1 | 3/2005 | Lowles | |

(Continued)

*Primary Examiner* — Erika Washington
(74) *Attorney, Agent, or Firm* — The Juhasz Law Firm (57) ABSTRACT

A communication device, method, and system. A network is adapted to detect and cause one or more network services to the wireless device to be disabled upon detecting that the wireless device is within a predetermined zone. The network service may include voice communication, text messages, emails, and data communication. The predetermined zone may include a speeding zone, a hospital zone, a movie theater zone, a church zone, or a performing arts theater zone. The predetermined zone may be a government law or a regulation, such as a State or a City. The predetermined zone may also be determined by a predetermined radius within the operation of the device.

29 Claims, 10 Drawing Sheets

(56) References Cited

U.S. PATENT DOCUMENTS

| | | | |
|---|---|---|---|
| 2005/0130633 A1* | 6/2005 | Hill | H04M 1/665 |
| | | | 455/414.1 |
| 2005/0221841 A1* | 10/2005 | Piccionelli et al. | 455/456.3 |
| 2005/0277428 A1* | 12/2005 | Nathan Brown | 455/456.3 |
| 2006/0036356 A1* | 2/2006 | Rasin et al. | 701/1 |
| 2006/0079243 A1 | 4/2006 | Bates et al. | |
| 2006/0160562 A1 | 7/2006 | Davis et al. | |
| 2007/0060122 A1* | 3/2007 | Tang et al. | 455/432.1 |
| 2007/0087764 A1* | 4/2007 | Buckley et al. | 455/466 |
| 2008/0019317 A1* | 1/2008 | Vellanki | H04M 1/72572 |
| | | | 370/331 |
| 2009/0322890 A1 | 12/2009 | Bocking et al. | |
| 2009/0325566 A1* | 12/2009 | Bell et al. | 455/419 |
| 2010/0056124 A1* | 3/2010 | Keating et al. | 455/418 |

* cited by examiner

NZR       32

| STATE 1 | ALLOWABLE |
|---|---|
| STATE 2 | NOT ALLOWABLE |
| • | • |
| • | • |
| • | • |
| • | • |

DEAD ZONE FOR WIRELESS COMMUNICATION DEVICE

FIELD OF INVENTION

This invention is directed to wireless communication devices and more particularly to a wireless communication device system, a wireless communication device, and a wireless communication method for disabling the use of wireless communication devices in places where they should not be used.

BACKGROUND

The cell phone is a widely used device. These devices allow people to talk, send text messages, emails, etc. The upside of these devices is that they allow people to stay connected anywhere anytime. The downside is that these devices are sometimes used in places or at times when they should not be used. For example, studies have shown that use of a cell phone while driving can increase the risk of an accident. Still a number of people use cell phones while driving a motor vehicle. Despite laws restricting the use of cell phones while operating a motor vehicle in a number of States in the U.S., rampant cell phone use during driving continues through unawareness or disregard of these laws, hence risking injury to the caller and others through an accident. As another example, studies have shown that radio waves transmitted by wireless devices may interfere with medical equipment. Still, a number of people use cell phones while in a hospital. Despite warnings telling callers to silence their cell phones when in the hospital, hospital cell phone use continues through unawareness or disregard of these laws, hence risking interference with medical equipment and the lives of those who depend on them. As yet further examples, there are places where the use of cell phones in places or at times may interfere with the public enjoyment, health, welfare, or safety. For instance, despite requests or common courtesy, a number of people use their cell phones during a movie theater, a performing arts hall, a church, or other places of public gathering, hence causing a distraction that may interfere with the movie, performance, worship or public gathering.

U.S. Pat. No. 6,979,724 is directed to a method for switching a cell phone from audible to silent mode of operation during a concert performance, a play, a conference, a meeting or dinner. An RF transmitter is provided with an omni-directional or directional antenna. The RF transmitter is locally mounted in the area where a cell phone is to be switched to silent mode of operation. The RF transmitter is programmed to broadcast a message containing a code. When in range of the RF transmitter broadcast, a cell phone that has been programmed to recognize the broadcast is automatically programmed by the broadcast to switch itself to silent mode of operation. Japanese laid open patent application H10-42371 is directed to a receiver/transmitter that is locally mounted at a hospital in the area where a cell phone is not to be used. The receiver/transmitter broadcasts a signal and waits for acknowlegement by a cell phone. On acknowledgement, a microcomputer associated with the receiver/transmitter determines whether the phone is set up for use. If the phone is so set up for use, the microcomputer broadcasts a warning over a speaker mounted in the hospital that the phone is not to be used in the hospital. Japanese laid open patent application J11-004190 is directed to a cell phone accessory that monitors engine speed and parking brake activity. The accessory is connected to a cell phone in a car to detect incoming calls to the cell phone. On detection of an incoming call, the accessory suppresses or reduces the volume of the cell phone ring tone and diverts the call for recording on an answering machine residing in the accessory for playback. Neither prior art disables the use of wireless communication devices in places where they should not be used.

There is a need for a communication system, device, and method for disabling the use of wireless communication devices in places where they should not be used.

SUMMARY

Communication system, device, and method is provided that disables the use of wireless communication devices in places where they should not be used.

The inventive communication system comprises a wireless communication device having a GPS detector for providing positioning data on the communication device; a network for controlling wireless communication over the network, the network receiving the positioning data from the communication device and comprising a no communication zone register including a database of predetermined zones in which certain communication by, to, or by and to the wireless communication device is to be disabled (i.e., dead zone). In operation, the network tracks the location of the wireless communication device based on the positioning data on the wireless communication device. When the wireless communication device is in a dead zone, the network disables the certain communication by, to, or by and to said wireless communication device. The disabling of the certain communication with respect to the wireless communication device may occur by network enablement of a service restriction on the network that prevents the wireless communication device to place, receive, or place and receive certain calls while the communication device is in the dead zone. Alternatively, the disabling of communication with respect to the wireless communication device occurs by network enablement of a flag in the wireless communication device using over the air programming techniques. When service is interrupted, the network may send the communication device a message indicating that service is interrupted because the communication device is in a no communication zone.

The inventive wireless communication device is provided with a GPS detector for providing positioning data and comprises a no communication zone register including a database of predetermined zones in which communication by, to, or by and to the wireless communication device is to be disabled. The inventive wireless communication device tracks its location based on positioning data and when the wireless communication device is in one of the predetermined zones in which certain communication by, to, or by and to the wireless communication device is not permitted (i.e., dead zone), the wireless communication device is disabled from handling said certain communication by, to, or by and to the wireless communication device. The disabling of communication with respect to the wireless communication device may occur by enablement of a flag in the wireless communication device that prevents the wireless communication device to place, receive, or place and receive the certain communication while the communication device is in the dead zone. When service is interrupted, the wireless communication device may display a message indicating that service is interrupted because the communication device is in a no communication zone.

The inventive method of disabling predetermined communication by, to, or by and to a wireless communication device comprises: creating a no communication zone of locations where said wireless communication device is to be disabled; tracking predetermined positioning data on the wireless communication device; querying whether the predetermined positioning data is within a no communication zone location; if the wireless communication device is in a no communication zone location, disabling certain communication by, to, or by and to the wireless communication device.

The predetermined zone may be a GPS location or the speed of movement of the wireless communication device in the network preferably derived from GPS position data. In one embodiment, the wireless communication device and/or the network recognize the wireless communication device is operating in a hands free mode of operation and may allow the communication device to send and receive messages when the device is operating in hands free mode of operation. The certain communication disabled excludes communication of an emergency call.

DESCRIPTION OF INVENTION

Figure 1:
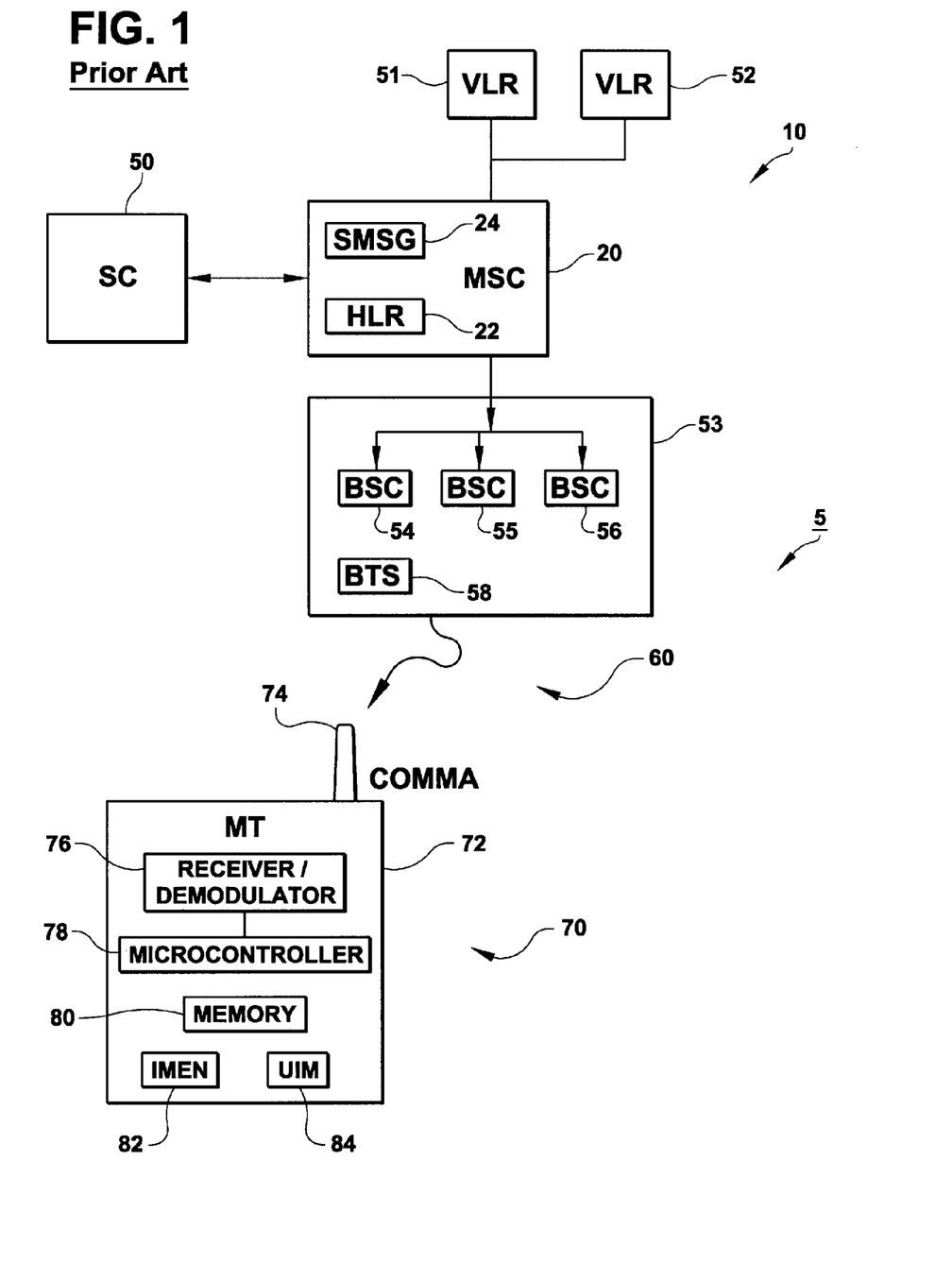
FIG. 1 is a representative prior art cell phone system.

Prior art FIG. 1 shows a representative prior art cell phone system 5 comprising a network 10, a plurality of cell phones 70, and in between the network and cell phone, an air interface 60. Network 10 typically includes a mobile switching center 20, an operational support center 50, visiting location registers 51, 52, and base station controllers 54, 55, 56, and base transceiver station 58 which may be collectively referred to as base station subsystem BSS 53. In the illustrative system of FIG. 1, mobile terminal 70 is illustratively based on the Groupe Speciale Mobile (GSM) standard, but may be based on other standards. MT 70 comprises a mobile unit 72 having an antenna 74, a receiver/demodulator 76, a microcontroller 78, memory 80, international mobile equipment number 82, and a user identity module 84 also referred to as a subscriber identify module or SIM. MT 72 communicates with network 10 through air interface 60.

Mobile switching center 20 is a telecommunications switch deployed in network 10 to provide call control, processing and access to the public switched telephone (fixed) network. The home location register 22 is a database that is maintained by a user's home carrier or the mobile operator with whom the user has initiated service. HLR 22 stores information about the user, including the user profile (preferences), account status, features and capabilities. Visiting location register 51, 52 is a database used by the serving carrier to manage service requests from mobile users who are away from the home system.

When MT 70 is powered on the IMSI or MIN of the mobile is sent to network 10 via the air interface 60. The mobile request to use the network is picked up by BTS 58. The call is directed to the MSC 20 that oversees the switching in which the mobile was powered on in. MSC 20 determines whether MT 70 is in its "home" area or whether it is a "visitor". MSC 20 makes this determination based on the IMSI or MIN information. If in the home area, HLR 22 provides information necessary to handle both origination of a call and placement of a call. It does so based on service subscription information, service restrictions and supplementary information in HLR 22. If in a visitor area, VLR 51, 52 requests information from the HLR 22 where MT 70 is registered so that the visited system can process the call appropriately. If MSC 20 determines that the mobile is authorized to use network 10, MSC 20 logs the phone onto network 10 and tells the mobile it is logged on.

Once logged on, when a user dials a GSM mobile subscriber's MSISDN or a TIA network MIN, the call is sent to MSN 20 which interrogates HLR 22 of the caller to obtain authorization and routing information stored in the service profile of the user associated with his MSISDN or MIN. MSC 20 illustratively routes the call over a public switching telecommunications network (PSTN) to the HLR of the number called. Based on the IMSI or MIN number, the called HLR looks up the called subscriber profile as well as the current VLR 51, 52 at which the called subscriber is registered. The called HLR 22 generates a response message and sends it back to the calling MSC 20. MSC 20 then attempts to complete the call based on the location of the destination provided by called HLR 22.

Billing tickets for all calls made in network 10 are typically produced on MSC 20. MSC 20 provides the billing tickets to the operational support systems 50 which provides the interface to the customer invoices and the bills. SC 50 includes systems for billing the subscribers as well as for subscriber administration, fraud detection, and voice mail. These systems collect billing data generated by MSC in network 10 and manage the subscriber databases in network 5.

Figure 2:
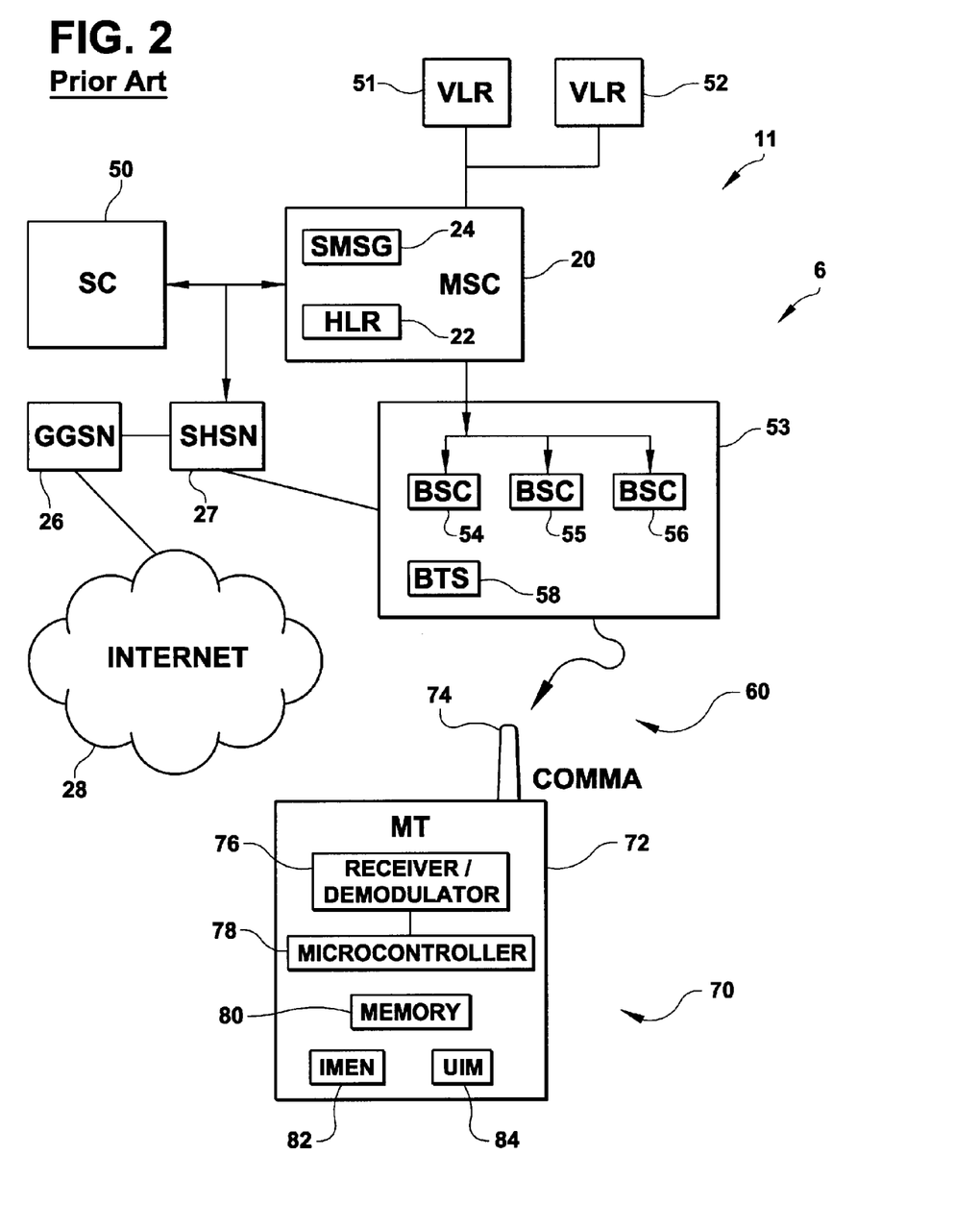
FIG. 2 is a representative prior art cell phone system of FIG. 1 provided with GPRS service designed for GSM networks.

Prior art FIG. 2 shows the representative prior art cell phone system 5 of FIG. 1 provided with GPRS service designed for GSM networks. GPRS provides an overlay service onto GSM that allows the mobile to access the Internet. GPRS allows a mobile to provide high-speed Internet data communications using the existing GSM air interface. GPRS provides a direct interface to the Internet services for GSM mobile devices and is implemented in an existing GSM network with the addition of two new elements. These elements are a Signaling GPRS Service Node (SGSN) 27 and a Gateway GPRS Service Node (GGSN) 26. Additional modifications to the base station systems to include packet control units are also required. GPRS allows a mobile to typically have an endless connection to an IP network that may stay open at low cost so that the mobile is connected to the network and enabled to connect to the Internet on initiation of a GDP Context message. Voice calls on GPRS handsets are routed by MSC 20 using the same circuit switched channels and protocols of GSM.

Figure 3:
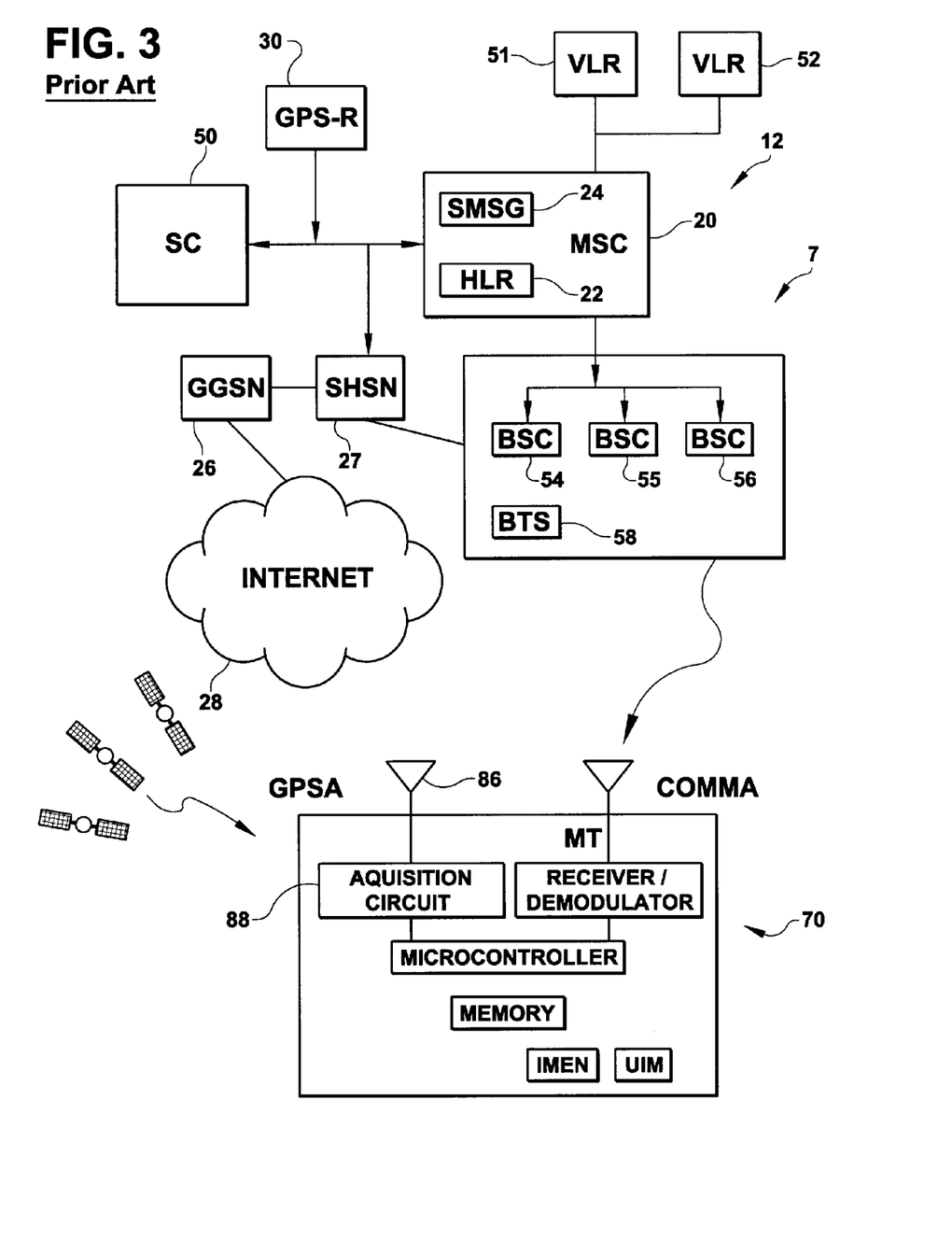
FIG. 3 is a representative prior art cell phone system of FIG. 2 provided with global positioning system (GPS).

Prior art FIG. 3 shows the representative prior art cell phone system 5 of FIG. 2 provided with global positioning system (GPS). The U.S. Global Positioning System is a constellation of 24 satellites which orbit the earth in 12 hour orbits. The satellites are arranged in six orbital planes each containing four satellites. The constellation provides a user with approximately five to eight satellites visible from any point on earth. These satellites transmit as part of their message both satellite positioning data called "ephemeris" data and clock timing data. The satellites also transmit time-of-week information which allows a receiver to determine accurate time. Many new phones in the U.S., for example, have some GPS receiving capability built in. As shown in FIG. 3, MT 70 further comprises a GPS antenna 86 and GPS acquisition circuitry 88 for capturing satellite messages for use in calculating MT 70 receiver location and other information such as speed and direction. Assisted GPS enhances the performance of the GPS system by helping MT 70 locate satellite signals when MT 70 is surrounded by tall buildings or is indoors or under trees and assist MT 70 in calculating its position. GPRS functionality in MT 70, which allows direct connection to the Internet services for GSM mobile devices using SGSN 27 and GGSN 26, allows MT 70 GPS location information to be provided to network 12 regularly to allow network 12 to provide real time location data on MT 70. GPS location information on MT 70 may be stored in GPS-R register 30. Network 10 may use real time GPS data to track MT 70 through the network or use information derived from GPS data such as speed and direction of travel of MT 70. All of this information may be stored in GPS-R register 30. In some cases, a service provider may provide MT 70 with GPS functionality that is accessibly by third-party applications. Some companies like Accu-Tracking have developed software for installation on an MT 70 having such third party accessible GPS functionality. For a subscriber, Accu-Tracking tracks GPS data on MT 70 including direction of travel and speed of travel and displays these parameters on a subscriber Website for viewing by the subscriber over a computer. This service allows for example a parent to use an MT 70 of a child to track the movement of the child and if the child is driving a car to track the speed of the car. The service even permits audible alerts to be sent to MT 70 in the event the child is speeding.

All of the foregoing is common knowledge to one skilled in the art.

Figure 4:
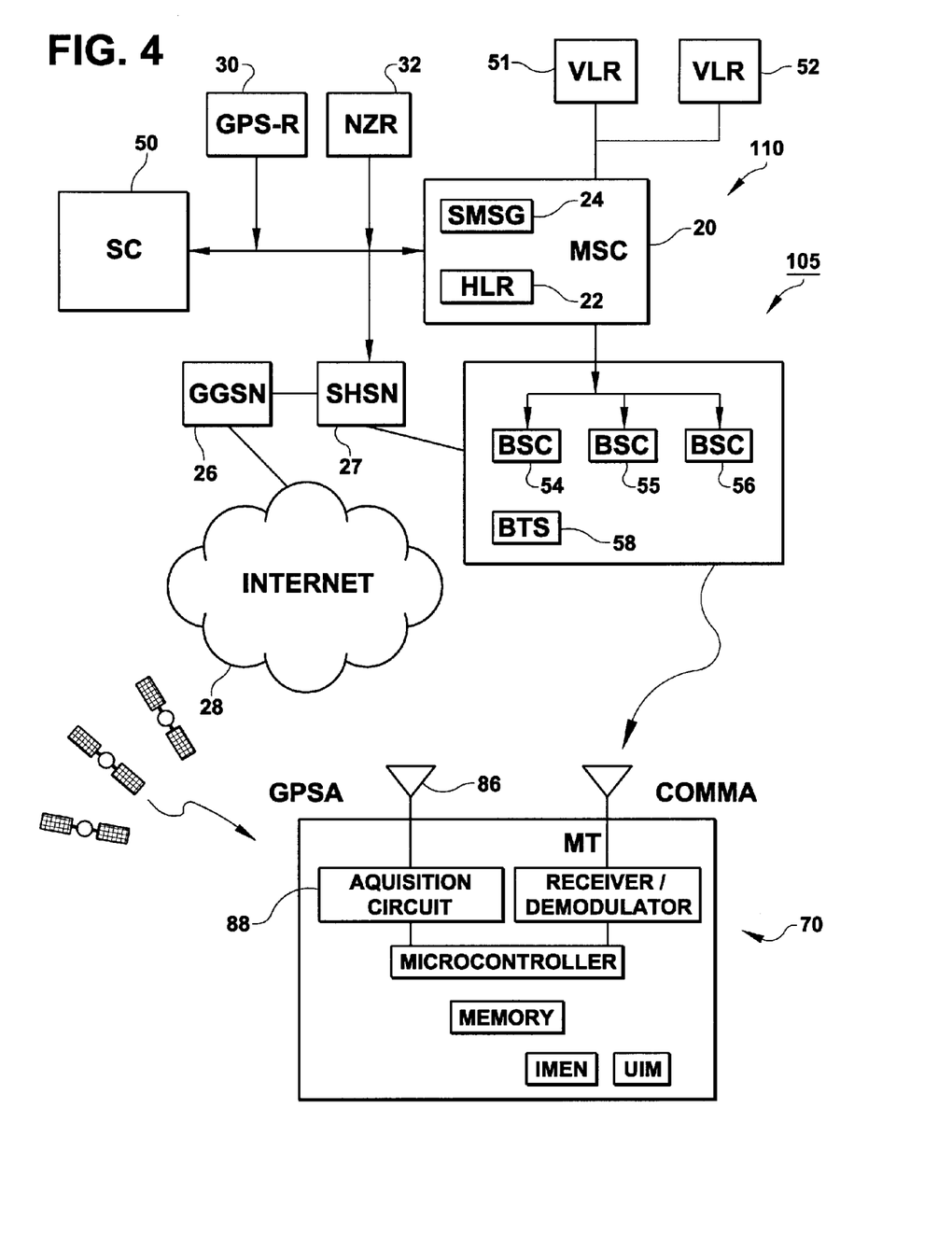
FIG. 4 is a preferred system embodiment of the invention.
Figure 5:
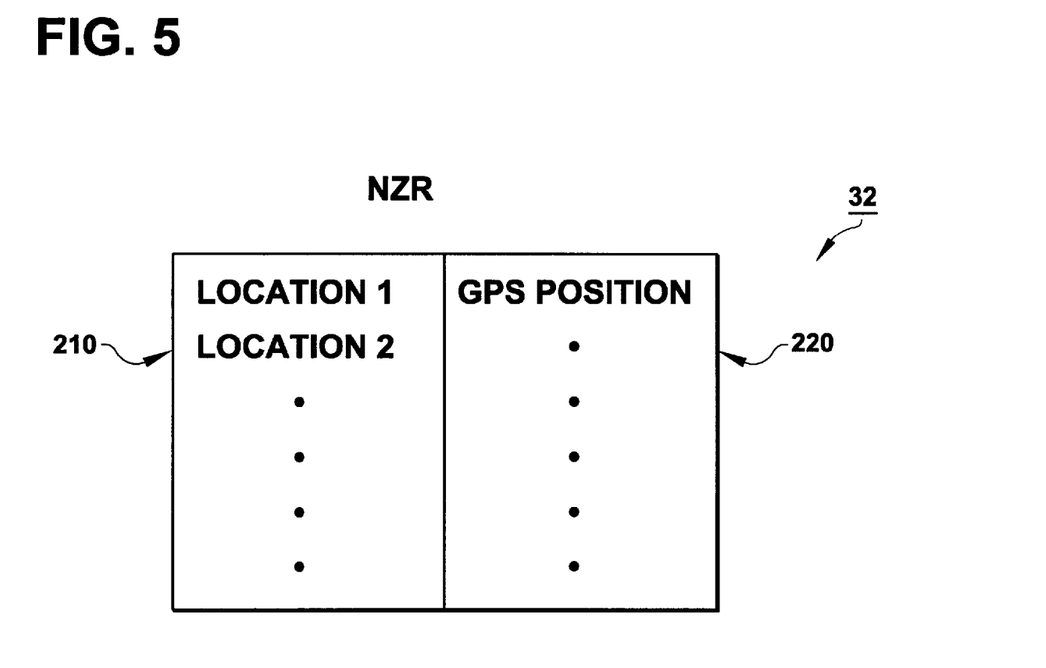
FIG. 5 is preferred embodiment of an inventive no zone register.

FIG. 4 shows a preferred embodiment of the present invention. In the present invention, a cell phone system 105 comprises the representative prior art cell phone system 5 of FIG. 3 and a no communication zone register 32. The representative elements of the prior art phone system 5 shown in FIG. 3 have been previously described. FIG. 5 shows a preferred embodiment of NZR 32. As shown in FIG. 5, NZR 32 is a register that preferably includes a table of geographical locations 210. Geographical locations 210 are physical locations in network 110 in which communication by or to MT 70 over network 110 is to be disabled. Geographical locations 210 may be a hospital, a movie theater, a performing arts hall, a church, or other places where the use of cell phones may interfere with the public enjoyment, health, welfare, or safety. For each location 210, a GPS position 220 of the location is provided for identifying the GPS position of that location. For a location that may be identified by an area of GPS positions, these GPS positions would be provided as GPS position 220 in the database of NZR 32.

In operation, GPRS functionality in MT 70 allows MT 70 GPS location information to be provided to network 110 regularly to allow network 110 to have real time location data on MT 70. GPS location information on MT 70 and derivative information such as speed and direction of travel of MT 70 generated by network 110 may be stored in GPS register 30. MSC 20 regularly queries whether the GPS location information of MT 70 is within a no communication zone (i.e., dead zone). If NZR 32 indicates MT 70 is not in a dead zone, the communication functionality of MT 70 remains enabled. If NZR 32 indicates MT 70 is in a dead zone, network 110 disables the communication functionality of MT 70 for so long as MT 70 is in the dead zone.

Figure 6:
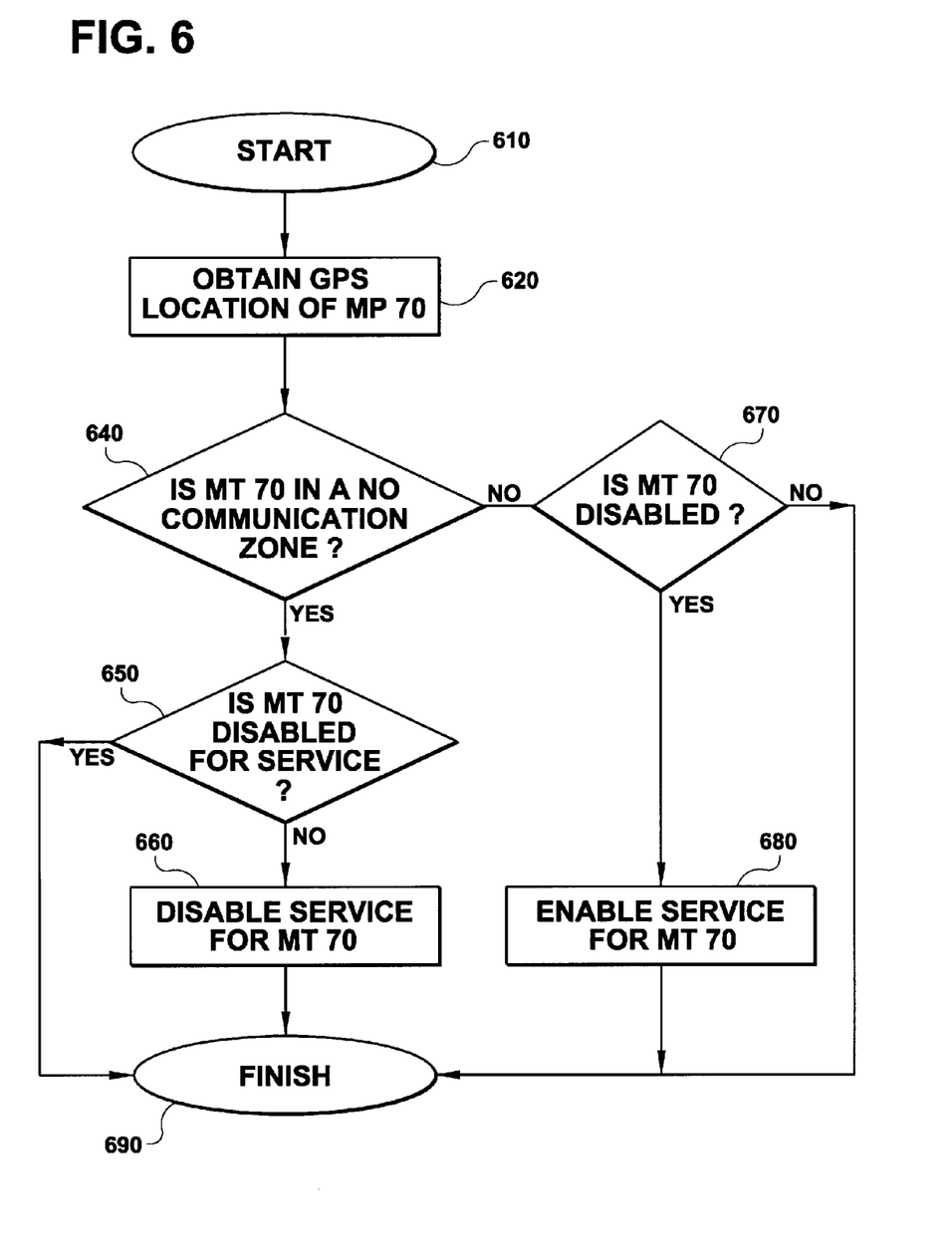
FIG. 6 is a preferred logic flow for the preferred system embodiment of FIG. 4 implemented with the inventive no zone register of FIG. 5.

FIG. 6 shows a logic flow diagram for the present invention. As shown, network 110 periodically or continuously employs the present invention by entering the logic shown in FIG. 6 at the start control block 610. At control block 620, network 110 obtains the present GPS location of MT 70 from GPS-R 30. At control block 640, network 110 queries whether the present GPS location of MT 70 is within a no communication zone location. Preferably, this is done by MSC 20 comparing the present location of MT 70 to the GPS locations contained in NZR 32. A match indicates MT 70 is in a no communication zone whereas a no match indicates that MT 70 lies outside that communication zone. If the query done at control block 640 indicates MT 70 is not in a no communication zone (i.e., dead zone), control branches to control block 670 where MSC 70 queries whether MT 70 is disabled. If MT 70 is not disabled because it was not in a dead zone, MSC 20 flows to control finish block 690 and the process is finished. If MT 70 is disabled because on the last pass through the control logic MT 70 was in a dead zone but on the current pass MT 70 in no longer in a dead zone, MSC 20 enables communication functionality of MT 70 at control block 680 and the process flows to control finish block 690. If the query at control block 640 indicates MT 70 is in a dead zone, control flows to control block 650 where network 110 queries whether the communication functionality of MT 70 is disabled. If the communication functionality is disabled, control flows to control finish block 690. If the control functionality is not disabled, network 110 control flows to control block 660 where the communication functionality of MT 70 is disabled after which the process flows to control finish block 690. Network 110 will keep communication functionality of MT 70 disabled for so long as MT 70 remains in the dead zone.

In the preferred embodiment, the control block 650 function of flagging off service for MT 70 is preferably done based on programmed service subscription information, service restrictions and supplementary information provided in HLR 22. For example, service restrictions on MT 70 may include disabling the service of MT 70 when MT 70 is in a dead zone. The same goes for service enablement. Alternatively, MT 70 service may be disabled or enabled using well known over-the-air programming techniques.

Figure 7:
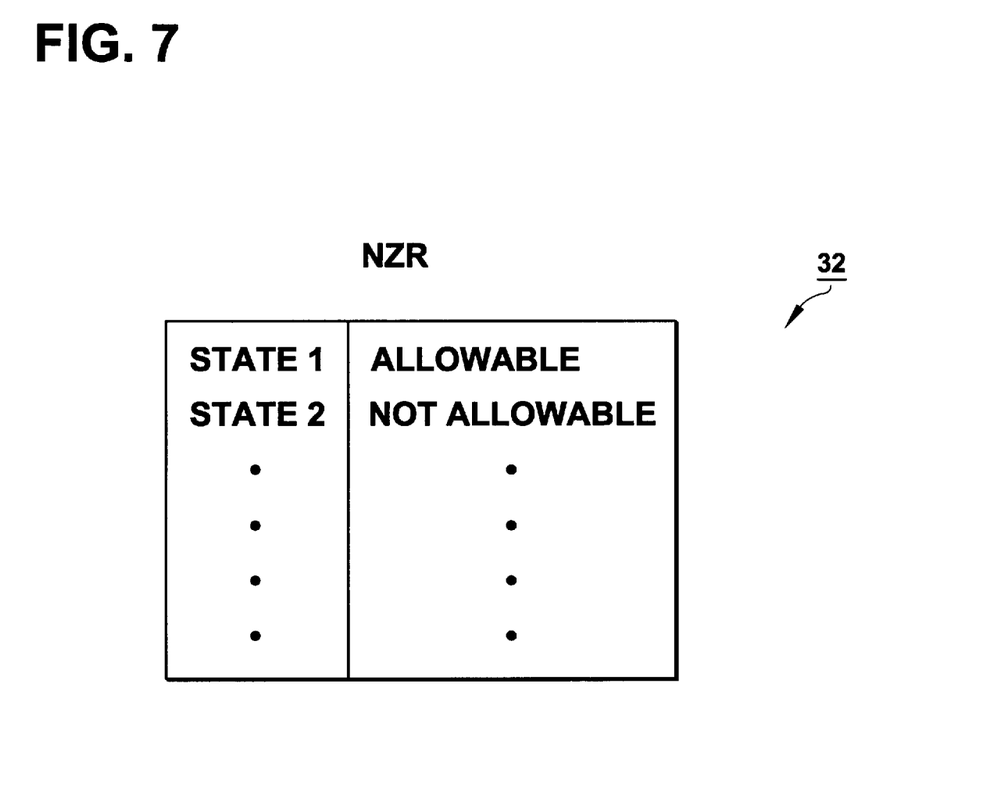
FIG. 7 is another embodiment of an inventive no zone register.

FIG. 7 shows another embodiment of the present invention in which NZR 32 contains a database of states and information on whether the state allows cell phones to be used in a moving vehicle. In this embodiment, the moving vehicle may be a car or truck or motorcycle or bicycle and the allowable speed may be as simple as allowable or not. For example, states that do not allow the use of cell phones while driving would be denoted on the list as not allowable whereas the other states would be denoted as allowable.

Figure 8:
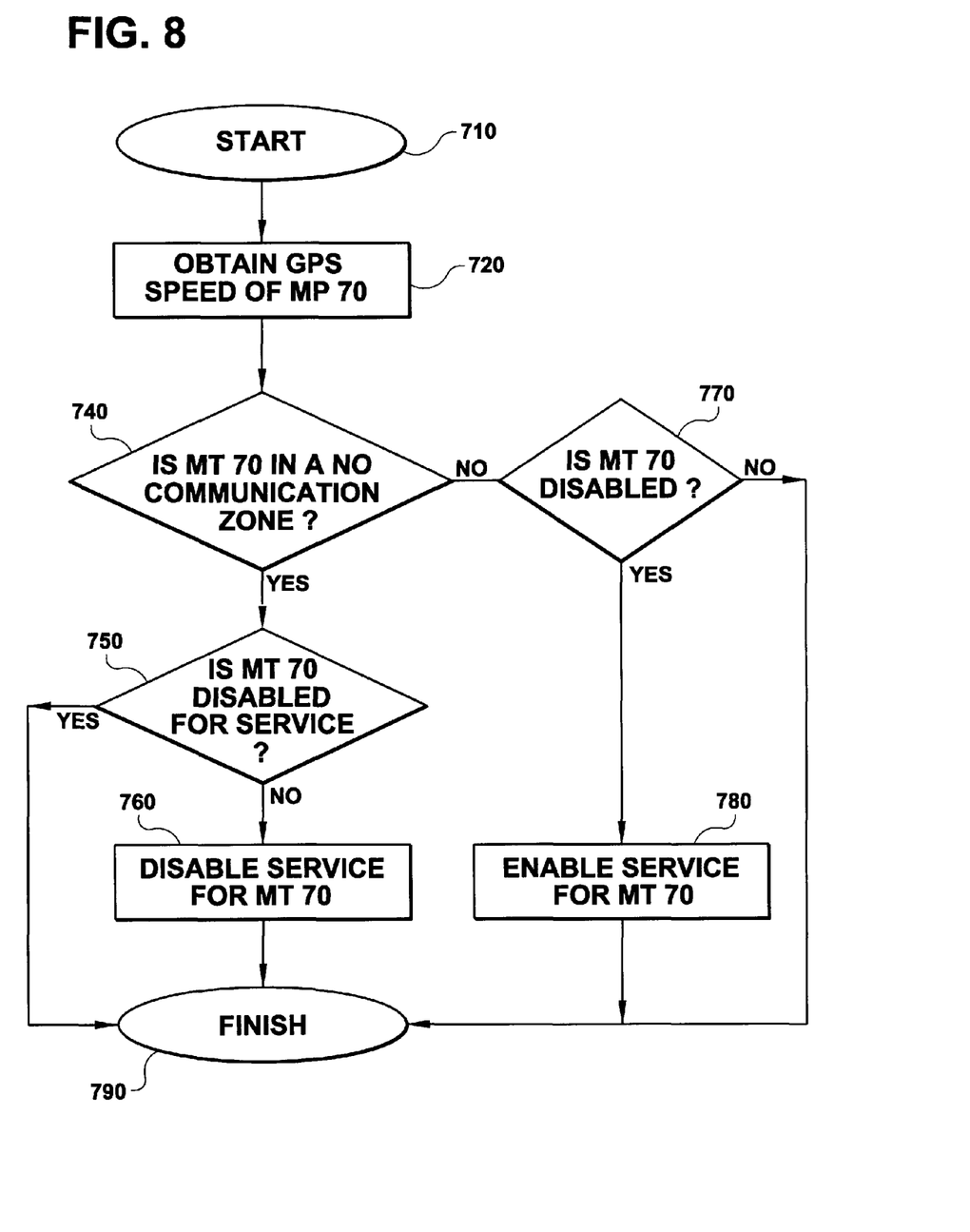
FIG. 8 is a preferred logic flow for the preferred system embodiment of FIG. 4 implemented with the inventive no zone register of FIG. 7.

Referring to the logic flow of this embodiment shown in FIG. 8, after entering the control process at control start block 710 MSC 20 would obtain the GPS speed of MP 70 at control block 720 and at control block 74 query whether the speed of movement of MT 70 is at or above the speed denoted in NZR 32 shown in FIG. 7. If the speed of movement of MT 70 is at or above the speed denoted in NZR 32, then process flows to control block 750 and continues on in a manner similar to the manner described with like process control blocks shown in FIG. 6. If the speed of movement of MT 70 is not at or above the speed denoted in NZR 32, then process flows to control block 770 and continues on in a manner similar to the manner described with like process control blocks shown in FIG. 6.

In the example, the speed denoted in NZR 32 is either allowable which means that MT 70 may be used in vehicles or not allowable which means that MT 70 may not be used while driving. Alternatively, in states where use of a cell phone while driving is not permitted, NZR 32 may be set at a low speed instead of a no speed condition as specified in the prior example in order to allow for the possible use of a cell phone in a moving but non-driving condition, such as, while walking. By trading off a no speed condition in NZR 32 for a speed of, for example, a typical walking speed of a person, such as 5 miles per hour, the cell phone would be useable while walking but not when driving at speeds at or above 5 miles per hour.

Figure 9:
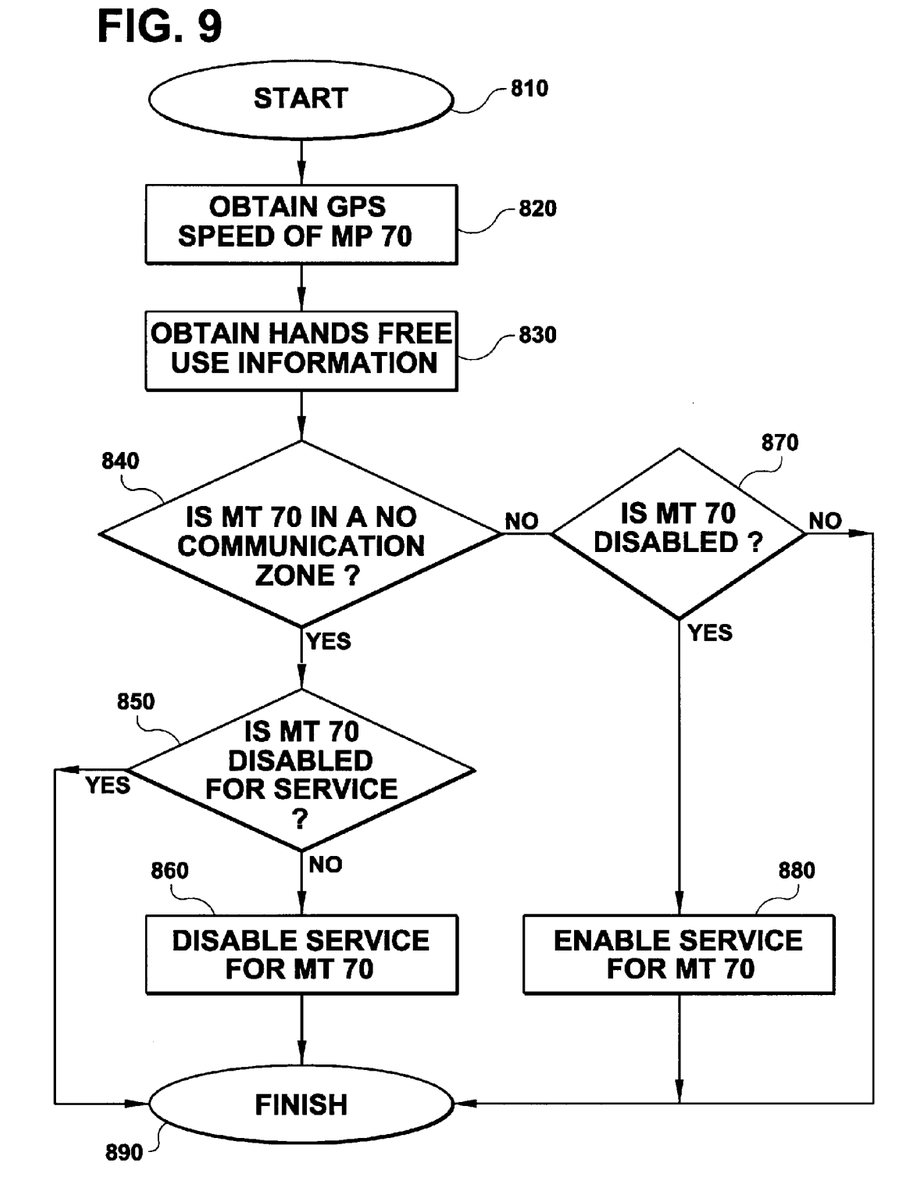
FIG. 9 is a preferred logic flow for the preferred system of FIG. 4 implemented with an inventive no zone register of FIG. 7 in a network that recognizes whether a mobile terminal in the network is being used in a hands free mode of operation.

In a further embodiment, in some states, cell phone use while driving is permitted so long as done using a hands free device. FIG. 9 shows an illustrative embodiment of a logic flow diagram which recognizes whether MT 70 is being operated in hands free mode of operation. When operated in hands free mode of operation, MT 70 detects the hands free operation and transmits that information to network 110. In this example, NZR 32 in FIG. 7 would further include a designation of allowable with hands free condition in addition to the allowable and not allowable conditions previously described. In the process flow shown in FIG. 9, the network obtains the GPS speed of MT 70 at control block 820 and further obtains the hands free use information of MT 70 at control block 830. At control block 840, a no communication zone condition would occur if, for the state which requires MT 70 to be operated in a hands free mode of operation for MT 70 to be useable while driving, the MT 70 information obtained by network 110 shows MT 70 to have a GPS speed that satisfies the speed condition for disablement of communication and the condition of being used without a hands free. Based on this query at control block 840 network 110 proceeds through the remaining process shown in FIG. 9 in a manner similar to the manner described with like process control blocks shown in FIG. 6.

The foregoing embodiments preferably would not disable the ability of cell phones to place 911 or like calls for emergency purposes. In addition, there may be other instances in which calls may likewise be permitted such as in connection with calls from or to family members.

In another embodiment, the network in either one or more of the foregoing embodiments may be provided with a messaging service for messaging MT 70 that service is interrupted because the communication device is in a no communication zone. For example, messaging may be generated by the network and transmitted to MT 70 via gateway SMSG 30 and illustratively displayed in text form on a display on MT 70. Messaging an MT 70 via SMS gateway SMSG 24 is common knowledge to one skilled in the art.

While the foregoing embodiments illustrate the use of the invention with GPS location and derived speed, in alternative embodiments the invention may be useable with any GPS direct or derived information. As one example, where acceleration is derived from GPS data, the use of MT 70 could be conditioned on the acceleration of MT 70 in the network. In addition, the invention may create conditions of dead zone of operation based on a blend of GPS and non-GPS data available to the network. For example, a dead zone may be further conditioned on the time of day of use of MT 70 such that at certain times of day a dead zone would exist to disable use of MT 70 whereas at other times of day the dead zone would be lifted to allow MT 70 to be used in that zone. In previous example further illustrates that the invention may be used alone or in combination with one or more direct or derived information. As yet another example of the use of the invention with a combination of information, in the situation where the operation of a communication device is not allowed in a city but allowed outside of a city, the invention would track both the location of MP 70 with respect to the city as well as the speed of the MP 70 at its location. Whether MT 70 would be operable would turn on the conditions that MT 70 satisfies where used.

In the previous embodiments, except as to establishments that may be mandated by applicable laws to be included on the dead zone list which would need to be included on the list, the network generates the dead zone list of hospitals, movie theaters, performing arts halls, churches, or other places where the use of cell phones may interfere with the public enjoyment, health, welfare, or safety preferably based upon publicly available information. In another embodiment, if the establishment is listed on the dead zone list by default, unless it is one of the mandated establishments, the establishment may have the option to elect to be dropped from the list so as to allow MT 70 to be used in its establishment. For example, a restaurant that may be included on the dead zone list by default may elect to be dropped from the list in order to allow its customers to use MT 70 in its establishment. As yet another embodiment, any establishment that may not be included on the default dead zone list may have the option to elect to be included on the dead zone. For example, a store or a football stadium may request to be included on the dead zone list in order to prevent the use of MT 70 from disturbing its patrons. As yet another example, inclusion of an establishment on the dead zone list may be by way of a service offering provided by the service provider. The service may be offered at no charge to an establishment or may offered on a subscription fee basis. With this service, an establishment may elect to have their establishment included on the dead zone list by subscription to the service.

Figure 10:
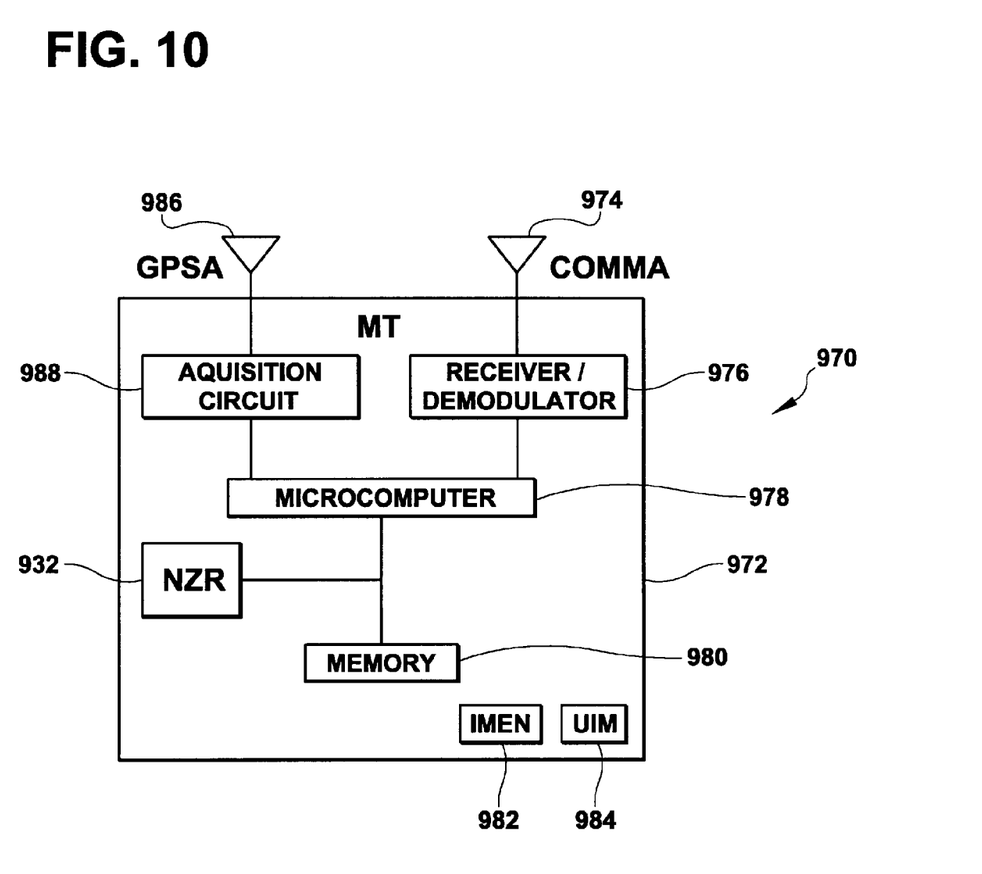
FIG. 10 is an alternative wireless communication device embodiment of the invention.

FIG. 10 shows another embodiment of the invention in which in the representative prior art cell phone system 7 of FIG. 3 MT 70 includes a no communication zone register 932 including a database of predetermined zones in which communication by, to, or by and to MT 970 is to be disabled. In this embodiment, MT 970 tracks its location based on GPS positioning data (alone or with the aid of AGPS). When MT 970 is in one of the predetermined zones in which certain communication by, to, or by and to MT 970 is not permitted, MT 970 is disabled from handling the certain communication by, to, or by and to MT 970. Preferably, NZR 932 is a register like shown and discussed in connection with FIG. 5 that preferably includes a table of geographical locations. The listing of geographical locations would be limited by the size of the register. If necessary in view of the size constraints of the available semiconductor space in MT 970, the geographical locations could be limited to a limited set of predetermined locations such as movie theaters within a 10 mile radius of the billing address of the mobile user. To be maintained current, NZR 923 could be updated by the network 12 in which MT 970 is authorized to be used by the employment of well known over the air reprogramming technologies. The logic for the invention shown in FIG. 10 is preferably like the logic shown in FIG. 6 except that control block 620, which is shown to obtains GPS location of MP 70, would be done by MP 970 and not by the network as discussed in connection with FIG. 6.

As an alternative embodiment, NZR 932 may be a register like shown and discussed in connection with FIG. 7 that preferably includes a table of conditions on the speed of MT 70. In this embodiment, MT 970 further comprises software for calculating the speed of MT 970 from GPS positioning data. Since speed is the distance traveled in a specified time, software may, using GPS position data, track the distance traveled by MT 970 in a specified time and calculate the speed. The sophistication of the calculation may be limited by available semiconductor considerations. The logic for this invention is preferably like the logic shown in FIG. 8 or 9 except that control block 720 and 820, which is shown to obtain speed information on MP 70, would be done by MP 970 and not by the network as discussed in connection with FIGS. 8 and 9.

In the embodiment of FIG. 10, the predetermined zone may be a geographical location, and preferable comprises a GPS position. Alternatively, the predetermined zone may comprise a condition on the speed of the wireless communication device in said network where the speed is preferably derived from GPS position data. Disabling of communication with respect to the wireless communication device in FIG. 10 may occur by enablement of a flag in the wireless communication device that prevents the wireless communication device to place, receive, or place and receive the certain communication while the communication device is in the no communication zone. The condition on the speed of the wireless device may be taken from the group of no communication allowed, communication allowed, and communication allowed under certain preconditions. The device may recognize that the wireless communication device is operating in a hands free mode of operation. The certain communication disabled preferably excludes communication under conditions taken from the group of the speed of said wireless communication device is less than a predetermined speed and said wireless is being used in a hands free mode of operation. The certain communication disabled preferably excludes communication under an emergency call. On interruption of service, the device may display a message indicating that service is interrupted because the communication device is in a no communication zone.

As yet another embodiment, MT 970 may be used in the network shown in FIG. 4. One of the benefits of such a hybrid configuration in which both the network and the terminal contain a no communication zone register is that it may allow for quicker adoption of the invention. This by allowing, for example, legacy mobile terminals, that are without the architecture and/or semiconductor real estate that might allow for over the air reprogramming of the terminal with no zone register communication functionality, to be disabled using no zone communication registers located in the network while newer model terminals are provided with no communication functionality in the terminal.

In the preferred method for disabling predetermined communication by, to, or by and to a wireless communication device; the method comprises: creating a no communication zone of locations wherein the wireless communication device is to be disabled; tracking predetermined positioning data on the wireless communication device; querying whether the predetermined positioning data is within the no communication zone location; and if the wireless communication device is in a no communication zone location, disabling certain communication by, to, or by and to the wireless communication device.

While the foregoing embodiments illustrate the use of the invention with GPS location and derived speed, in alternative embodiments the invention may be useable with any GPS direct or derived information. As one example, where acceleration is derived from GPS data, the use of MT 70 could be conditioned on the acceleration of MT 70 in the network. In addition, the invention may create conditions of dead zone of operation based on a blend of GPS and non-GPS data. For example, a dead zone may be further conditioned on the time of day of use of MT 70 such that at certain times of day a dead zone would exist to disable use of MT 70 whereas at other times of day the dead zone would be lifted to allow MT 70 to be used in that zone. The previous example further illustrates that the invention may be used alone or in combination with one or more direct or derived information. As yet another example of the use of the invention with a combination of information, in the situation where the operation of a communication device is not allowed in a city but allowed outside of a city, the invention would track both the location of MP 70 with respect to the city as well as the speed of the MP 70 at its location. Whether MT 70 would be operable would turn on the conditions that MT 70 satisfies where used.

While the foregoing embodiments for disablement of MT 70 have been disclosed, there are other ways well known to those skilled in the art in which communication by, to, or by and to a wireless communication device may be restricted and each of these other well known ways provide yet other embodiments how the communication of MT 70 may be disabled and the implementation of these other ways of restricting the wireless communication of MT 70 are incorporated herein as to these other embodiments that use Applicant's dead zone invention for wireless communication devices. For example, disablement may occur by the network or device flagging on a feature that overrides the password of MT 70 when MT 70 is in a dead zone which prevents a user from unlocking his phone for use while in the dead zone. As yet another example, disablement may occur by the network or device flagging on a feature that disables the send/receive keypad on MT 70.

In the previous embodiments, except as to establishments that may be mandated by applicable laws to be included on the dead zone list which would need to be included on the list, preferably the network generates the dead zone list of hospitals, movie theaters, performing arts halls, churches, or other places where the use of cell phones may interfere with the public enjoyment, health, welfare, or safety preferably based upon publicly available information. In another embodiment, if the establishment is listed on the dead zone list by default, unless it is one of the mandated establishments, the establishment may have the option to elect to be dropped from the list so as to allow MT 70 to be used in its establishment. For example, a restaurant that may be included on the dead zone list by default may elect to be dropped from the list in order to allow its customers to use MT 70 in its establishment. As yet another embodiment, any establishment that may not be included on the default dead zone list may have the option to elect to be included on the dead zone. For example, a store or a football stadium may request to be included on the dead zone list in order to prevent the use of MT 70 from disturbing its patrons. As yet another example, inclusion of an establishment on the dead zone list may be by way of a service offering provided by the service provider. The service may be offered at no charge to an establishment or may offered on a subscription fee basis. With this service, an establishment may elect to have their establishment included on the dead zone list by subscription to the service.

While the invention has been described in connection with specific embodiments, it is evident that numerous alternatives, modifications, and variations will be apparent to those skilled in the art within the spirit and scope of the invention described above.

I claim:

1. A communication system comprising:
    a wireless device;
    a network configured to communicate with the wireless device, the network including a mobile switching center;
    a first register, maintained on the network, the first register comprising a first database of physical locations in which a network communication service provided to the wireless device is to be disabled, the physical locations defined in the first database by a plurality of GPS position entries that define an area;
    the mobile switching center configured to query whether the wireless device is within a one of the physical locations defined in the first register and to disable a network communication service provided to the wireless device when the wireless device is in the one of the physical locations defined in the first database; and
    a second register, maintained on the wireless device, the second register comprising a second database of physical locations in which a communication function of the wireless device is to be disabled, the physical locations defined in the second database by a plurality of GPS position entries that define an area;
    the wireless device configured to query whether it is within a one of the physical locations defined in the second register and to disable the communication function of the wireless device when it is in the one of the physical locations defined in the second database.

2. The communication system of claim 1 wherein the wireless device includes GPS acquisition circuitry for capturing satellite messages for use in calculating a location of the wireless device.

3. The communication system of claim 1 further comprising assisted GPS for use in calculating the physical location of the wireless device.

4. The communication system of claim 1 wherein the one of the physical locations defined in the first database is selected from the group consisting of a hospital, a movie theater, a performing arts hall, a church, a restaurant, a store, and a football stadium.

5. The communication system of claim 1 wherein on disablement of the network communication service the wireless device displays a message that the network communication service provided to the wireless device is disabled.

6. The communication system of claim 1 wherein the network communication service provided to the wireless device is selected from the group consisting of voice communication, text messages, emails, and data communication.

7. The communication system of claim 1 wherein disablement of the network communication service is based upon programmed service subscription information.

8. The communication system of claim 1 wherein the first database of physical locations in which the network communication service provided to the wireless communication device is to be disabled is populated with data by default.

9. The communication system of claim 1 wherein the first database of physical locations in which the network communication service provided to the wireless communication device is to be disabled is populated with data by subscription.

10. The communication system of claim 1 wherein the disabling of the network communication service provided to the wireless device when the wireless device is in the one of the physical locations defined in the first register is except as to communication with a family member.

11. The communication system of claim 1, wherein the second database of physical locations in which the communication function of the wireless device is to be disabled contains only physical locations within a predetermined radius of operation of the wireless device, the predetermined radius being centered on a single fixed geographic location.

12. The communication system of claim 11, wherein the single fixed geographic location comprises a billing address of a user of the wireless device.

13. The communication system of claim 1 wherein the one of the physical locations defined in the second database is selected from the group consisting of a hospital, a movie theater, a performing arts hall, a church, a restaurant, a store, and a football stadium.

14. The communication system of claim 1 wherein the communication function of the wireless device is selected from the group consisting of voice communication, text messages, emails, and data communication.

15. A communication method comprising:
    determining a physical location in which a network service of a wireless device may be disabled when the wireless device is outside of a predetermined zone, the physical location defined in a first database by a plurality of GPS position entries that define an area, the first database maintained on a wireless communication network;
    querying by a message service center of the wireless communication network whether the wireless device is within the physical location defined in the first database;
    disabling by the message service center of the network service when the wireless device is within the physical location defined in the first database;
    determining a physical location in which a communication function of the wireless device may be disabled when the wireless device is within the predetermined zone, the physical location defined in a second database by a plurality of GPS position entries that define an area, the second database maintained on the wireless device;
    determining on the wireless device whether the wireless device is within the physical location defined in the second database; and
    disabling by the wireless device of the communication function of the wireless device when the wireless device is within the physical location defined in the second database;
    wherein the second database of physical locations in which the communication function of the wireless device is to be disabled contains only physical locations within a predetermined radius of operation of the wireless device, the predetermined radius being centered on a single fixed geographic location; and wherein the predetermined zone corresponds to the predetermined radius of operation of the wireless device.

16. The method of claim 15 wherein the step of querying by the message service center whether the wireless device is within the physical location is performed using GPS generated position data.

17. The method of claim 15 wherein the network service is selected from the group consisting of voice communication, text messages, emails, and data communication.

18. The method of claim 15 wherein the physical location defined in the first database is selected from the group consisting of a hospital, a movie theater, a performing arts hall, a church, a restaurant, a store, and a football stadium.

19. The method of claim 15 further comprising:
displaying a message that the network service provided to the wireless device is disabled.

20. The method of claim 15 wherein the disabling by the message service center of the network service is based upon programmed service subscription information.

21. The method of claim 15 wherein the disabling by the message service center of the network service is determined by default data.

22. The method of claim 21 further comprising the step of opting a physical location out of the default data in which the network service is disabled by the message service center.

23. The method of claim 21 further comprising the step of opting a physical location into the default data in which the network service is disabled by the message service center.

24. The method of claim 15 wherein the disabling by the service center of the network service when the wireless device is within the physical location is except as to communication with a family member.

25. The method of claim 15 wherein the disabling by the service center of the network service when the wireless device is within the physical location is for so long as the wireless device remains in the physical location.

26. The method of claim 15 wherein the disabling by the service center of the network service when the wireless device is within the physical location based upon the time of day.

27. The method of claim 15, wherein the single fixed geographic location comprises a billing address of a user of the wireless device.

28. The method of claim 15 wherein the function of the wireless device is selected from the group consisting of voice communication, text messages, emails, and data communication.

29. The method of claim 15 wherein the physical location defined in the second database is selected from the group consisting of a hospital, a movie theater, a performing arts hall, a church, a restaurant, a store, and a football stadium.

* * * * *